Aug. 26, 1969    M. I. GLASS ET AL    3,462,857
TOY
Original Filed Nov. 17, 1966
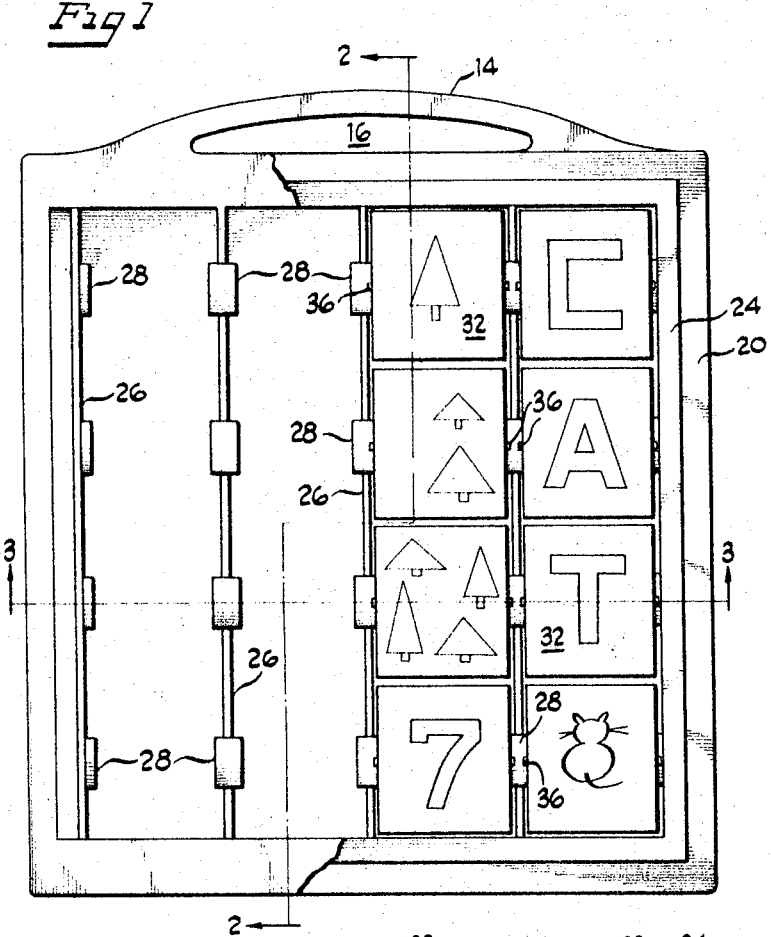
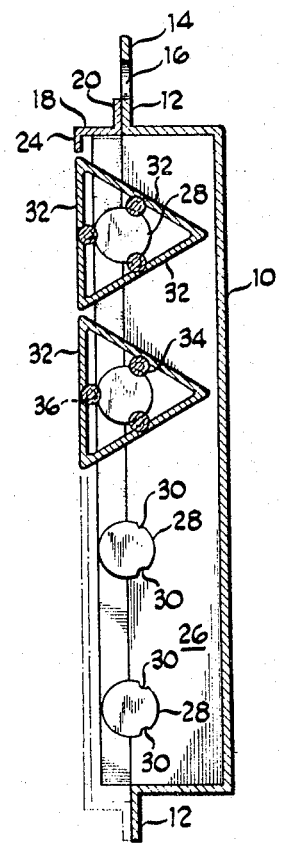
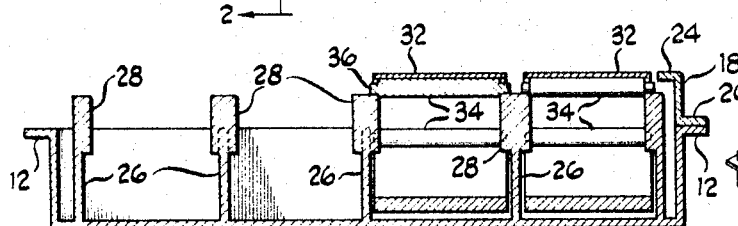
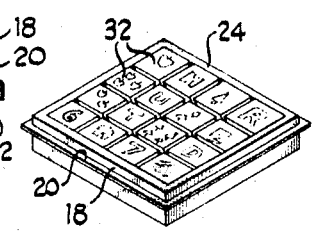
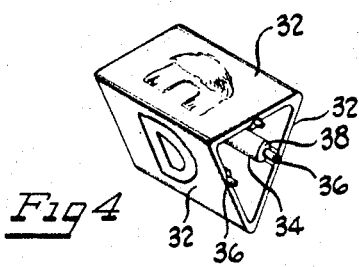
INVENTORS
MARVIN I. GLASS
GORDON A. BARLOW
BY Lucas & Coffee
ATTORNEYS

United States Patent Office 3,462,857
Patented Aug. 26, 1969

3,462,857
TOY
Marvin I. Glass, Chicago, and Gordon A. Barlow, Evanston, Ill., assignors to Marvin Glass & Associates, Chicago, Ill., a partnership
Continuation of application Ser. No. 595,261, Nov. 17, 1966. This application Nov. 21, 1968, Ser. No. 784,516
Int. Cl. G09b 1/20
U.S. Cl. 35—77           1 Claim

ABSTRACT OF THE DISCLOSURE

A toy including a generally rectangular frame having spaced partition members and a plurality of circular bearing members projecting on each side of the partition members. Detents on the circular members cooperate with end openings in blocks having three indicia bearing flat faces.

---

This is a continuation of application Ser. No. 595,261, filed Nov. 17, 1966.

This invention relates to a toy in which rotatable blocks are held within a frame. On the faces of each of the blocks are placed pictures or sections of pictures or letters or numbers or other marking. By rotating the blocks so that a particular face of each block is displayed in the plane of the top of the frame, various overall patterns or pictures may be shown.

In one form of the toy, triangular shaped blocks with parallel ends are arranged in parallel rows within the frame to form a square. The surface of each face of the blocks is illustrated and by rotating the individual blocks, the correct face of each block can be exposed horizontally on the upper surface of the frame to provide a desired combination of illustrations. In one form of the apparatus there are provided three complete pictures which can be assembled in the manner of a jigsaw puzzle.

In another model of the device, the faces of the blocks may include a picture of an animal or other object and letters arranged to be correlated with the picture to teach a child to spell.

In a still further form of the device, the faces of the blocks may be painted with numbers and objects for use in teaching addition.

Accordingly, the principal object of the present invention is the provision of a simple mechanical apparatus for an educational toy involving rotatable blocks, in which the parts are anchored in place to prevent loss and which may be easily operated and used by a very young child who is just beginning the learning process.

A further object of the present invention is the provision of novel pivoting means on the blocks, comprising a set of shafts anchored within easy triangular block for supporting the blocks on discs fixed on the frame. The shafts may be rotated about the discs and thus reversible rotary movement of the blocks is permitted. This means of mounting the blocks gives a simple, economical structure which provides a frictional contact between the blocks and the frame at all times and prevents the blocks from oscillating when the frame is moved or held in a non-horizontal position.

A still further object of the invention is to provide a releasable locking means for the rotary blocks. When a particular face is moved into position in the plane of the top of the frame, the locking means is effective to hold the block in that position regardless of the angle at which the frame is held.

A preferred embodiment of the toy is shown in the accompanying drawing, in which:

FIGURE 1 shows a top plan view of the toy, partly in section, with eight blocks in position in the right half of the frame and with no blocks and an exposed frame in the left half of the frame;

FIGURE 2 is a cross section along the lines 2—2 of FIGURE 1;

FIGURE 3 is a cross section along the lines 3—3 of FIGURE 1;

FIGURE 4 is a perspective view of one of the triangular blocks, showing the shafts which support the block for rotation; and FIGURE 5 is a perspective view of the assembled toy.

In the embodiment shown in the drawings, the frame comprises a base 10 in the form of a square pan with a flange 12 extending horizontally and outwardly from the top of the side walls. This flange 12 is provided along one side wall with an extension 14 having an opening 16 therein (FIGURE 1) to provide a handle. By means of this handle 14 the frame and game apparatus may be conveniently carried.

A cover member 18 is secured to the base 10. The cover member has an outwardly and horizontally extending flange 20 at its base. This flange 20 mates with flange 12 on the base and the two flanges are suitably secured together, as by an adhesive material or by suitable fasteners extending through the flanges. From the top of the cover member 18, a flange 24 extends horizontally over the interior of the base 10 a short distance to form a frame for the rotary blocks mounted within the base, as will be hereafter explained.

Five vertical partition members 26, are fixed in parallel relationship in the pan base 10 and extend from one side thereof to the opposite side. These partition members divide the base into four sections. At regular intervals along the top of each of the partition members, there are positioned discs 28 which provide a journal bearing or support for the rotary blocks. The embodiment shown in the drawing has sixteen rotary blocks, and accordingly, each partition member has four discs. The discs are located at intervals so to be centered with respect to each block (see FIGURE 2). Each disc 28 on the three inner partition members is wider than the partition member to provide a peripheral surface around which the block support means for adjoining blocks may move. The discs 28 on the outboard partitions extend only inwardly from the partition to provide such a support surface on the inboard side of the partition.

Each of the discs 28 has on its periphery at least two depressed areas or grooves 30 (FIGURE 2) at predetermined intervals around the circumference of the disc. The depressions form releasable locking means for holding the blocks stationary when the blocks are in a given position, i.e. with a flat surface in the plane of the top of the frame.

The individual blocks, as best seen in FIGURE 4, are equilateral triangles in shape, with parallel ends and three flat faces 32. The interior of each block is hollow.

On the inner side of each flat face 32 there is fixed a shaft 34. This shaft extends lengthwise of the flat surface 32 at the center of the surface. The ends 36 of the shafts 34 are preferably of smaller diameter than the center portion of the shaft and protrude a short distance beyond the ends of the block. Shoulders 38 are formed near the end of each shaft.

Each block is adapted to be placed between two opposing discs 28 on the partition members 26. When the blocks are so positioned, the shaft extensions 36 rest on and fit around each disc. The shoulder 38 fits against the vertical side wall of the disc, and thus positions and holds the block between the discs and in spaced relation to the partitions 26.

The depressed areas or grooves 30 are so located around the periphery of the discs 28 that two of the shaft extensions 36 enter the grooves 30 when one of the surfaces 32 is parallel with the cover portion 24 of the frame. The depressions thus serv as locking means to locate and hold the block in this position regardless of the angle at which the frame may be held or in which direction it may be moved. Accordingly, if a particular picture or marking has been moved into display as a result of rotation of the blocks, that picture or marking will not be disturbed if the frame is held at an angle other than horizontal.

The locking means are easily releasable since the grooves 30 are sufficiently shallow that a manual push on the edge of a block will cause the shaft extensions to move out of the depressions 30 and allow the block to rotate.

As will be apparent from FIGURES 1, 4 and 5, the flat surfaces 32 of each block may be marked with a portion of a picture. With triangular blocks, three complete pictures can be displayed. With this marking on the blocks there can be provided a simple form of jigsaw puzzle. The blocks may be rotated until the desired complete picture is displayed in the plane of the top of the frame. Further, each picture may have a different background color so as to make it easier for the child to assemble the desired complete picture.

Suitable markings and illustrations can also be used on the blocks for teaching a child to spell. For example, as illustrated in Column A of FIGURE 1, each of the top three rows of blocks may be provided with letters and the lowermost block provided with pictures in a manners such that proper placement of the letter blocks will produce the spelling of the object illustrated in the lowermost block. This can be simplified by color coding the blocks, so that by placing all of the same color blocks in upwardly facing relation a child is shown an object and the spelling of the name of the object.

Similarly, the blocks can be marked to teach simple addition. The top three blocks, as illustrated in Column B of FIGURE 1, can be provided with illustrations of similar objects and the lowermost block will automatically indicate the tottal number of objects seen in the row when four similarly colored blocks are exposed in that row.

The illustrated embodiment is preferable entirely made of plastic, but other suitable materials can be used. Although shown and described with respect to particular embodiments, it will be apparent that various modifications might be made without departing from the principles of this invention.

What we claim is:

1. A toy comprising a generally rectangular frame having an integrally formed handle along one side and having parallel, spaced-apart partition members therein, a plurality of generally circular bearing members fixed on each side of said partition members in laterally projecting relation to said partition members, a plurality of blocks arranged in parallel rows in said frame with each block having three substantially flat faces forming an equilateral triangle, said generally circular bearing members being deformed at spaced-apart positions along their periphery for cooperation with end openings in said blocks to releasably maintain said blocks in any of three selected positions with one of said flat faces facing upwardly in said frame, said deformed peripheral portions also cooperating with an open end portion of said block to provide friction therebetween at all times during rotation of the block relative to its supporting bearing members, different indicia on each of said block faces which are coordinated with the respective positions of said blocks in said rows so that the indicia on a block at the end of the row is definitely related to the indicia on the remaining blocks in said row when said blocks are properly positioned.

References Cited

UNITED STATES PATENTS

| 1,396,379 | 11/1921 | Moore | 35—70 |
| 1,636,371 | 7/1927 | Kenney | 35—77 X |
| 2,052,848 | 9/1936 | Schilling. | |
| 2,211,635 | 8/1940 | Barteaux | 235—117 X |
| 2,476,580 | 7/1949 | Bergman | 35—77 |
| 2,628,618 | 2/1953 | Karper | 129—16 |
| 2,628,838 | 2/1953 | Smalley | 40—28 X |
| 3,061,947 | 11/1962 | Faudree | 35—31 |

FOREIGN PATENTS 144,507  6/1920  Great Britain.

EUGENE R. CAPOZIO, Primary Examiner

HARLAND S. SKOGQUIST, Assistant Examiner